United States Patent Office 3,234,780
Patented Feb. 15, 1966

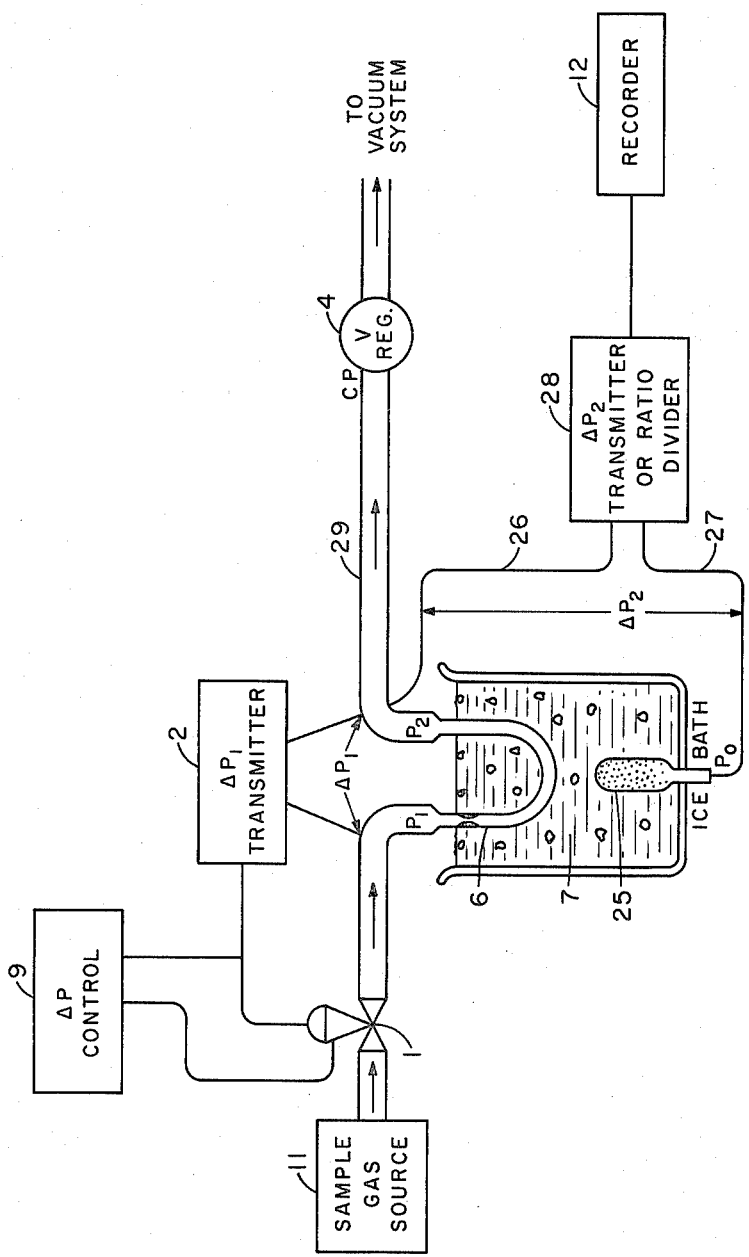

3,234,780
TEMPERATURE COMPENSATED CONDENSATION
PRESSURE ANALYZER
William S. Pappas, Oak Ridge, Tenn., assignor to the United States of America as represented by the United States Atomic Energy Commission
Original application Mar. 26, 1962, Ser. No. 183,339. Divided and this application June 25, 1965, Ser. No. 467,155
2 Claims. (Cl. 73—29)

This invention relates to gas analyzers and more particularly to an analyzer for continuously analyzing a stream of process gas for determining the concentration of a selected condensable component thereof. This application is a division of the copending application of Pappas et al., Serial No. 183,339, filed March 26, 1962.

With increased industrial handling of uranium hexafluoride, the need exists for simple, low-cost instruments to monitor and control the concentration of uranium hexafluoride in gas streams. The requirement for an instrument to accurately monitor uranium hexafluoride concentration in the presence of fluorocarbons, hydrogen fluoride, oxygen and nitrogen has not previously been fulfilled. Because of the complexity of the gas mixtures, an analyzer not affected by gas density is desirable.

Prior art methods of determining the concentration of a condensable gas in a gas mixture may utilize any of various types of frost detectors. Such devices usually comprise a means for maintaining constant pressure, means for varying the temperature of the system and a means for determining the temperature at which condensation takes place. Numerous disadvantages inherent in systems wherein controlled variations in temperature are necessary will become apparent.

Instruments based upon the measurement of acoustic velocity, upon absorption of radiation, and upon fluid density have been applied to the determination of uranium hexafluoride in binary mixtures. Since these methods provide only an average measurement of the physical property involved, they are not reliable for determining uranium hexafluoride in complex gas mixtures.

In a system where the uranium hexafluoride was contaminated with heavy fluorocarbons as well as light components, the aforementioned methods were tried unsuccessfully. An analyzer sensitive only to the uranium hexafluoride concentration was not in existence.

In another example, a gaseous diffusion system test loop facility may be equipped with a mass spectrometer for the detection of light contaminant gases in a uranium hexafluoride process system. Typically these light contaminants consist of $O_2$, $N_2$, and HF. These contaminants are preferably kept at a concentration below 1 mole percent. The mass spectrometer is effective in determining the presence of $O_2$ and $N_2$ but is unreliable in determining concentrations of HF. In the past the compressor itself in conjunction with the mass spectrometer has been found to be effective for determining the presence of HF in the recycling process system. That is, if no $O_2$ or $N_2$ is indicated by the mass spectrometer, yet the compressor does not develop the volume flow and head which is expected, there is assumed to be HF contamination. A remedy for this situation is to "sweep" or purge the recycling system with new inventory, thus recharging the compressor until no resultant change in compressor performance is noted.

This mode of operation is undesirable because small percentages of HF (less than 1%) may well go unnoticed since the effect on compressor performance would be small. However, when testing a compressor design with no previous history, even larger percentages of HF may go unnoticed. This method of dealing with HF contamination in the test loops is a tedious, time-consuming operation and is, therefore, costly as well as unreliable.

A prior art method for detecting HF has been the infrared analyzer. This method was undesirable because the instrument did not lend itself readily to on-stream continuous operation in a process system.

It is an object, therefore, of the present invention to provide a method and apparatus for continuously determining the concentration of uranium hexafluoride or other condensable gas in a gaseous mixture, said method being independent of thermal lag, capable of a high degree of precision and readily adaptable for control purposes in a process system.

Applicant has as another object of his invention the provision of a method and apparatus for continuously measuring the concentration of a gas in a multicomponent gas stream which is independent of variations of impurities.

Applicant has as another object of his invention the provision of a method and apparatus for continuously measuring the concentration of a condensable gas in a multicomponent gas stream which is substantially independent of variations in temperature.

Applicant has as a further object of his invention to provide an automatic temperature compensation means to eliminate errors introduced by temperature fluctuations at the constriction of the analyzer.

Other objects and advantages of my invention will appear from the following specification and accompanying drawing and the novel features thereof will be particularly pointed out in the annexed claims.

The figure is a schematic of a gas analyzer with temperature compensation.

As mentioned in the copending application of Pappas et al., supra, analytical errors are introduced by changes in the temperature of the condensation capillary; a fluctuation of $\pm 0.1°$ C. at $0°$ C. will cause an error of $\pm 0.8\%$ of the analytical value.

The figure is an improvement over the system of FIGURE 1 of the copending application of Pappas et al., supra, in that it overcomes or compensates for the effects of variations in temperature at the capillary, permitting more precise and accurate analysis.

In the arrangement of the figure, a bulb or other suitable $UF_6$ container 25 is located in close proximity to the cooled capillary 6 so that fluctuations in the temperature of the capillary will effect the temperature of the $UF_6$ bulb likewise. The pressure exerted by the sample gas at equilibrium conditions in the system is compared to the pressure exerted by the pure $UF_6$ maintained at the same temperature as the cooled capillary in differential pressure transmitter 28 joined through lines 26, 27 thereto.

The $UF_6$ content in the sample gas can be obtained by measurement on recorder 12 of the differential pressure ($\Delta P_2$) between the pure and impure gases, by obtaining the ratio of the two pressures ($Po/P_2$) or by the ratio $\Delta P_2/P_2$. By these methods the effect of temperature changes on vapor pressure will be compensated since the vapor pressure of pure $UF_6$ will be compared to the sample pressure at the same temperature. A commercially available ratio divider can be used for converting the latter two aforestated pressure measurements into percent condensable component present.

In its operation, a $UF_6$ sample is introduced through line 11 and flows through the system including capillary 6 and line 29 as indicated by the arrows. Condensation of $UF_6$ in the cooled capillary 6 causes an increase in pressure drop across the capillary indicated at $\Delta P_1$ of transmitter 2. This pressure drop is sensed by the $\Delta P_1$ transmitter 2 which generates a signal to the $\Delta P$ control 9 which in turn actuates the pressure control valve 1 and the inlet sample pressure is reduced until a specified $\Delta P_1$ is again obtained. The action of the pressure control valve 1 is to affect slight pressure changes so that the equilibrium pressure is sought and found. A flow control means 4 downstream of the capillary 6 is provided so that the capillary 6 will be capable of reaching the condensation pressure. Flow control 4 may be an orifice, a differential pressure-type controller, a capillary, a needle valve or other flow restricting means.

When a state of equilibrium is achieved, i.e., when $UF_6$ vaporization is just equal to $UF_6$ condensation in the cool capillary 6, the partial pressure exerted by the $UF_6$ present in the $UF_6$ gas stream is equivalent to the vapor pressure of pure $UF_6$ under the same temperature conditions. Therefore, the pressure, $P_2$, is equal to the partial pressure of the $UF_6$ present plus the partial pressures exerted by the light contaminants present. The mole percent of $UF_6$ present then can be expressed as:

$$\text{Mole percent } UF_6 = \frac{\text{partial pressure } UF_6}{\text{total sample pressure}} \times \frac{Po}{P_2} \times 100$$

By measuring the pressure ratio $Po/P_2$, thermal errors are eliminated. An inexpensive commercially available "ratio divider" will perform this division to better than 1% accuracy. A preferred method is referred to as the differential pressure, or "direct impurity measurement" method which is based on the assumption that the difference between $P_2$ and $Po$ is due to the presence of impurities. Since $\Delta P_2$ (i.e., $P_2-Po$) is a very small number (about 1 to 2% of $P_2$), the instrumentally induced error will be minimized when the impurities are measured, rather than the condensable. That is, at 99% $UF_6$ instrumentation capable of 1% accuracy will give 1% $UF_6$ error when measuring $Po$ but only 0.01% $UF_6$ error when measuring $\Delta P_2$. Near 100% condensable, $\Delta P_2$ is almost linear with impurity content.

Table I, which follows, compares the effect of minor temperature changes on the accuracy of a "temperature compensated" Condensation Pressure Analyzer (calculated by the differential pressure measurement method $\Delta P$) and the non-temperature compensated Condensation Pressure Analyzer of FIGURE 1 of the copending application of Pappas et al., supra. Note that at 99 mole percent $UF_6$ a 100-fold reduction in temperature error is indicated. For the $\Delta P/P_2$ method, variations in temperature do not affect the analysis.

TABLE I

*Calculated analytical errors caused by temperature variation in the cooling bath*

| Temp. deviation, °C. from 40.3° C. | CPA at 97-100% $UF_6$, Error | Temperature compensated CPA (A± type) at $UF_6$ | | | |
|---|---|---|---|---|---|
| | | 100% | 99% | 98% | 97% |
| | | Error | | | |
| 0.1 | 0.61 to 0.63 | 0 | 0.006 | 0.012 | 0.018 |
| .5 | 3.01 to 3.10 | 0 | 0.03 | 0.06 | 0.09 |

Because of the dynamic pressure measurement, there may be a small bias between measured $P_3$ and expected $P_2$. This bias can be measured at 100% condensable concentration and instrumentally "zeroed" out.

The "temperature compensated" Condensation Pressure Analyzer has been applied to the determination of "total impurities" in a $UF_6$ stream containing HF, $O_2$ and $N_2$. Table II shows a comparison of the total impurities present as determined by the present invention compared with the total impurities determined by the combination of the infra-red and line recorder analysis. The improved device agrees with established methods within 0.01%.

TABLE II

*Analysis of gases including HF*

| | Total impurities recorded by subject invention, percent | HF content infra-red, percent | $O_2$ and $N_2$ by line recorder, percent | percent |
|---|---|---|---|---|
| 1 | 0.35 | 0.12 | 0.22 | 0.34 |
| 2 | 0.09 | 0.04 | 0.06 | 0.10 |
| 3 | 0.61 | 0.06 | 0.56 | 0.62 |

Table III shows the comparison of the analyses made by the Temperature Compensated Condensation Pressure Analyzer and the line recorder under conditions in which the HF concentration is negligible.

TABLE III

*Analysis of test gases*

| Date | Percent total impurities by subject invention | Percent $O_2$ and $N_2$ by line recorder |
|---|---|---|
| 4-11-61 | 0.47 | 0.47 |
| | 0.46 | 0.47 |
| 4-12-61 | 0.47 | 0.49 |
| | 0.50 | 0.51 |
| | 0.54 | 0.55 |
| Sweep with pure UF | | |
| 4-13-61 | 0.00 | 0.01 |
| | 0.02 | 0.02 |
| | 0.03 | 0.03 |
| | 0.05 | 0.04 |
| | 0.04 | 0.04 |
| | 0.06 | 0.10 |
| | 0.06 | 0.06 |
| | 0.12 | 0.06 |

While this invention has been described in connection with a $UF_6$ gas mixture contaminated with other gases such as $N_2$, $O_2$ and HF, it should be realized that other condensable gases could be substituted for $UF_6$ in the example.

Having thus described my invention, I claim:

1. A system for continuously measuring the concentration of a condensable component of a gas stream comprising a channel for the passage of a gas stream, a control valve for controlling the inflow of a gas stream, a constriction located downstream from the control valve, means for maintaining the temperature of the constriction at a predetermined value to condense a selected component of the stream and alter the pressure therein to limit the flow of said stream, a flow control positioned downstream from the constriction to limit the rate of evacuation therefrom, and a differential pressure transmitter coupled across the constriction and responsive to a pressure drop thereacross to regulate the upstream control valve and change the gas pressure to produce equilibrium, a sample of the selected component maintained at the same temperature as the constriction, a pressure indicator, and means responsive to the difference in pressure between the sample and the gas stream adjacent the constriction for operating the pressure indicator.

2. A system for continuously determining the concentration of a condensable component of a gas stream comprising a line for transporting the gas toward a low pressure system, a control valve for regulating the flow of a gaseous mixture, a sensing element located downstream from the control valve for detecting the condensation of a selected component of the mixture, means for cooling the line at the position of the sensing element to a predetermined temperature to produce condensation of the component and alter the pressure therein, a flow control positioned downstream from the sensing element to limit the rate of evacuation therefrom, means coupling the sensing element to the control valve and responsive to a pressure drop at the sensing element for controlling the operation of the upstream control valve to produce equilibrium, a sample of the selected component maintained at the same temperature as the cooled portion of the line, a pressure recorder, and differential pressure monitoring means coupled to the line adjacent the sensing element and to the sample, and responsive to the difference in pressure for operating the pressure indicator.

No references cited.

RICHARD C. QUEISSER, *Primary Examiner.*